(12) United States Patent
Nakamura

(10) Patent No.: US 11,789,744 B2
(45) Date of Patent: Oct. 17, 2023

(54) INFORMATION PROCESSING DEVICE AND INDUSTRIAL ROBOT

(71) Applicant: NIDEC SANKYO CORPORATION, Nagano (JP)

(72) Inventor: Kazuhiro Nakamura, Nagano (JP)

(73) Assignee: NIDEC SANKYO CORPORATION, Nagano (JP)

(*) Notice: Subject to any disclaimer, the term of this patent is extended or adjusted under 35 U.S.C. 154(b) by 83 days.

(21) Appl. No.: 17/580,639

(22) Filed: Jan. 21, 2022

(65) Prior Publication Data

US 2022/0236997 A1    Jul. 28, 2022

(30) Foreign Application Priority Data

Jan. 26, 2021  (JP) .................................. 2021-010109

(51) Int. Cl.
    *G06F 9/44*      (2018.01)
    *G06F 9/4401*    (2018.01)
    *G06F 9/38*      (2018.01)
    *G06F 9/54*      (2006.01)

(52) U.S. Cl.
    CPC .......... *G06F 9/4411* (2013.01); *G06F 9/3836* (2013.01); *G06F 9/546* (2013.01)

(58) Field of Classification Search
CPC ....... G06F 9/4411; G06F 9/3836; G06F 9/546
See application file for complete search history.

(56) References Cited

FOREIGN PATENT DOCUMENTS

JP    2019200570 A    11/2019

*Primary Examiner* — Zahid Choudhury
(74) *Attorney, Agent, or Firm* — HAUPTMAN HAM, LLP

(57) ABSTRACT

An information processing device includes a first information processing part having a first calculation part and a second information processing part having a second calculation part, which are communicated with each other. The first information processing part includes a first communication part and a first data storage part. The first calculation part is configured to execute a first communication device driver, a first periodic communication application, a first non-periodic communication application, and a first data processing application. The first data processing application integrates data which are read from a transmission periodic data list stored in the first data storage part with data which are read from a transmission non-periodic data list stored in the first data storage part to process into transmission integrated data, and the transmission integrated data are transmitted from the first communication part through execution of the first communication device driver.

5 Claims, 14 Drawing Sheets

INFORMATION PROCESSING DEVICE AND INDUSTRIAL ROBOT

CROSS REFERENCE TO RELATED APPLICATION

The present invention claims priority under 35 U.S.C. § 119 to Japanese Application No. 2021-010109 filed Jan. 26, 2021, the entire content of which is incorporated herein by reference.

FIELD OF THE INVENTION

At least an embodiment of the present invention may relate to an information processing device and an industrial robot.

BACKGROUND

Conventionally, an information processing device has been known which includes a first information processing part having a first calculation part and a second information processing part having a second calculation part and in which the first information processing part and the second information processing part are communicated with each other.

For example, a traffic signal system described in Japanese Patent Laid-Open No. 2019-200570 (Patent Literature 1) as an information processing device includes a main control unit as a first information processing part and a transmission unit as a second information processing part, and the main control unit and the transmission unit are communicated with each other. Each of the main control unit and the transmission unit is individually provided with a CPU (Central Processing Unit) as a calculation part.

In Patent Literature 1, a communication system between the main control unit and the transmission unit is not specifically described, but it is conceivable that two communication systems, i.e., periodic communication and non-periodic communication may be adopted. Periodic communication is a system which regularly transmits and receives data at a predetermined cycle, for example, periodically transmits and receives sensing data. On the other hand, non-periodic communication is a system which transmits and receives predetermined data at a non-periodic timing, for example, transmits and receives an error signal which is suddenly generated.

In order to realize periodic communication between the main control unit and the transmission unit, each CPU of the respective units is required to individually execute periodic communication for periodically transmitting and receiving data by executing a periodic communication application. Further, in order to realize non-periodic communication between the main control unit and the transmission unit, each CPU of the respective units is required to individually execute non-periodic communication for non-periodically transmitting and receiving data by executing a non-periodic communication application.

Respective source codes of the periodic communication application and the non-periodic communication application are commonly different from each other according to a configuration of a communication device.

For example, in each of the units, a communication device may be configured so that each of two SPIs (Serial Peripheral Interface) as a communication device individually executes periodic communication. In this case, the source code of the periodic communication application include a cord for periodically creating predetermined data to transmit from one SPI and a code for periodically creating other predetermined data to transmit from the other SPI.

Alternatively, for example, in each of the units, a communication device may be configured so that each of mutually different types of data is periodically communicated by one SPI. In this case, the source code of the periodic communication application includes, for one SPI, a cord for transmitting predetermined data periodically created and a cord for transmitting other predetermined data periodically created.

In a case that a configuration of a communication device which is a later-developed product in a traffic signal system is different from a configuration of a precedent communication device due to a design change, a source code of a periodic communication application is required to be changed and thus, large time and labor is required. This is a problem in a case that a configuration of a communication device for performing periodic communication is changed. However, also in a case that a configuration of a communication device for performing non-periodic communication is changed, a similar problem may occur.

SUMMARY

In view of the problem described above, at least an embodiment of the present invention may advantageously provide an information processing device and an industrial robot described below. In other words, at least an embodiment of the present invention may advantageously provide an information processing device and an industrial robot in which, in a case that a configuration of a communication device is changed, time and labor of changing source code of a periodic communication application and time and labor of changing source code of a non-periodic communication application can be reduced.

According to at least an embodiment of the present invention, there may be provided an information processing device including a first information processing part having a first calculation part and a second information processing part having a second calculation part, and the first information processing part and the second information processing part are communicated with each other. The first information processing part includes a first communication part configured to execute communication and a first data storage part configured to store data. The first calculation part is configured to execute a first communication device driver which is software for making the first communication part execute communication; a first periodic communication application configured to execute first periodic communication in which data for transmission are periodically created and recorded by being added to an FIFO type transmission periodic data list stored in the first data storage part and, in addition, data are read from a reception periodic data list which is an FIFO type data list periodically received by the first communication part and stored in the first storage part; a first non-periodic communication application configured to execute first non-periodic communication in which data for transmission are non-periodically created and recorded by being added to an FIFO type transmission non-periodic data list stored in the first data storage part and, in addition, data are read from a reception non-periodic data list which is an FIFO type data list non-periodically received by the first communication part and stored in the first storage part; and a first data processing application configured to process data. The first data processing application integrates the data which are read from the transmission periodic data list stored in the first data storage part with the data which are read from the transmission non-periodic data list stored in the first data storage part to process into transmission integrated data, and the transmission integrated data are transmitted from the first communication part through execution of the first communication device driver.

Effects of the Invention

According to the present invention, in a case that the communication device configuration is changed, time and labor of changing the source code of the periodic communication application and time and labor of changing the source code of the non-periodic communication application can be reduced.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Figure 1:
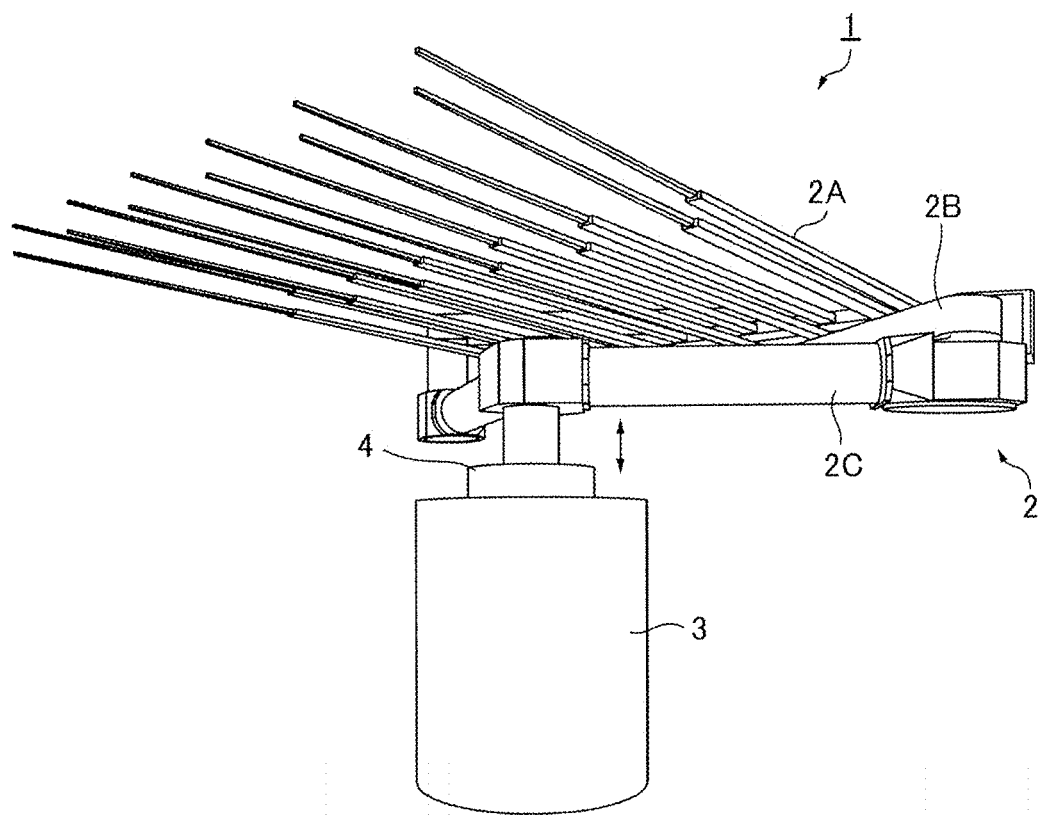
FIG. 1 is a perspective view showing an industrial robot in accordance with an embodiment of the present invention.

A robot controller and an industrial robot in accordance with at least an embodiment of the present invention will be described below with reference to the accompanying drawings. In the drawings, in order to easily understand respective structures, the structures are described so as to be different from actual structures, and reduction scales and the number of the described structures may be different from the actual structures.

Figure 2:
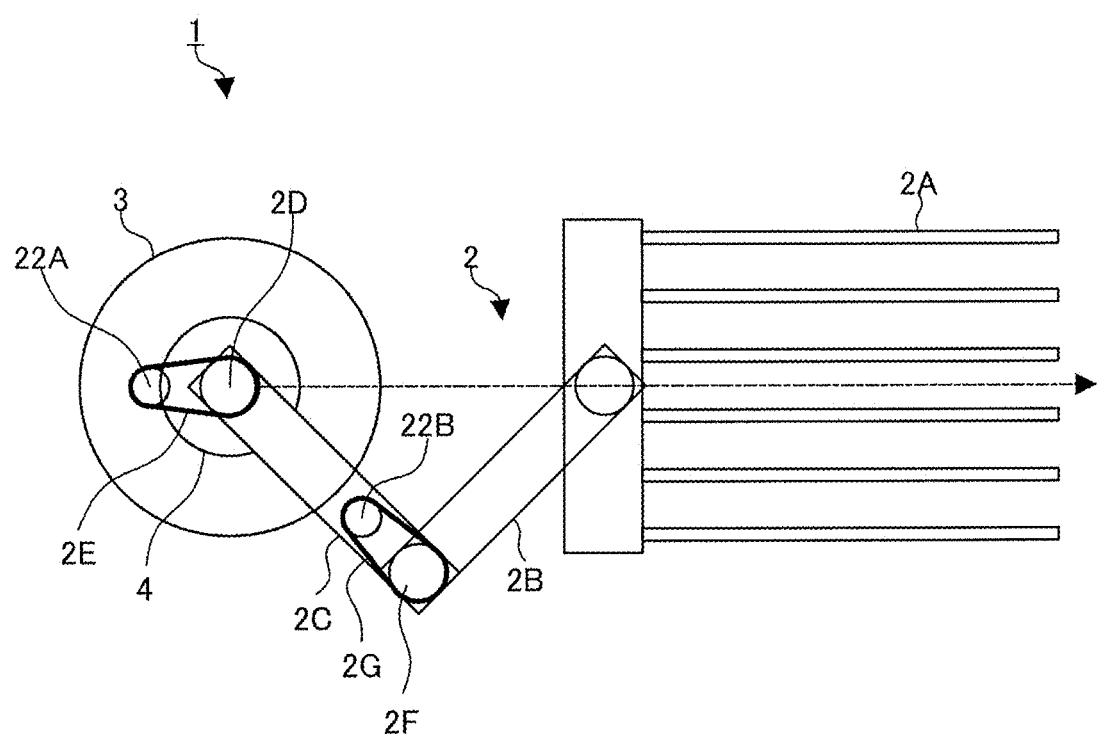
FIG. 2 is a plan view showing the industrial robot.

FIG. 1 is a perspective view showing an industrial robot 1 in accordance with an embodiment of the present invention. FIG. 2 is a plan view showing the industrial robot 1. The industrial robot 1 is a robot for conveying a glass substrate and includes an arm 2, a frame 3 and a lifting part 4. The lifting part 4 is held by the frame 3 and ascends and descends in an upper and lower direction (arrow direction in FIG. 1) by driving a lifting motor not shown. The arm 2 includes a hand part 2A on which a glass substrate is placed, a forearm part 2B and an upper arm part 2C, and the arm 2 is held by the lifting part 4.

A shoulder joint 2D which is a connection part with the lifting part 4 in the upper arm part 2C is capable of turning along a horizontal direction by driving a first motor 22A. Specifically, a rotation drive force of the first motor 22A is transmitted to the shoulder joint 2D through a first belt 2E to turn the shoulder joint 2D in the horizontal direction. Further, an elbow joint 2F which is a connection part between the upper arm part 2C and the forearm part 2B is capable of turning along the horizontal direction by driving a second motor 22B. Specifically, a rotation drive force of the second motor 22B is transmitted to the elbow joint 2F through a second belt 2G to turn the elbow joint 2F in the horizontal direction. Further, a wrist joint which is a connection part between the forearm part 2B and the hand part 2A is capable of turning along the horizontal direction by receiving a drive force of the second motor 22B through a belt.

The lifting part 4 in FIG. 1 is capable of ascending and descending in the arrow direction in the drawing by normal rotation and reverse rotation of the lifting motor.

Figure 3:
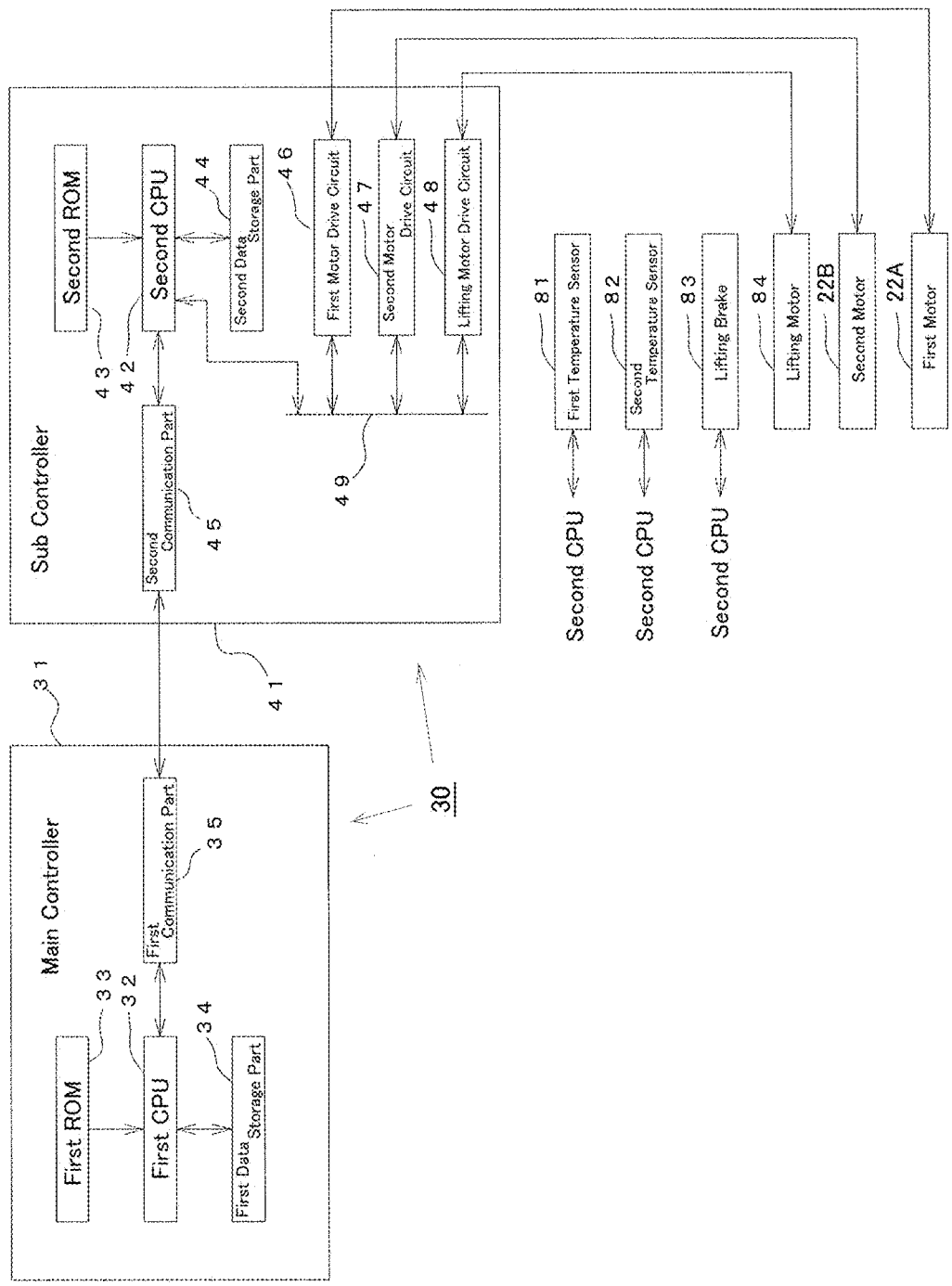
FIG. 3 is a block diagram showing a main part of an electric circuit of the industrial robot.

FIG. 3 is a block diagram showing a main part of an electric circuit of the industrial robot 1. The industrial robot 1 includes a robot controller 30 which is an information processing device, a first temperature sensor 81, a second temperature sensor 82, a lifting brake 83, a lifting motor 84, the first motor 22A and the second motor 22B.

The robot controller 30 includes a main controller 31 which is a first information processing part and a sub controller 41 which is a second information processing part. The main controller 31 includes a first CPU 32 which is a first calculation part, a first ROM (Read Only Memory) 33, a first data storage part 34 and a first communication part 35. The first ROM 33 is recorded with various applications and device drivers. The first CPU 32 executes the applications recorded in the first ROM 33 and executes the device drivers recorded in the first ROM 33. The first data storage part 34 is configured of a RAM (Random Access Memory) or the like. The first communication part 35 executes communication with the sub controller 41.

The sub controller 41 includes a second CPU 42 which is a second calculation part, a second ROM 43, a second data storage part 44, a second communication part 45, a first motor drive circuit 46, a second motor drive circuit 47, a lifting motor drive circuit 48 and a bus 49. The second ROM 43 is recorded with various applications and device drivers. The second CPU 42 executes the applications recorded in the second ROM 43 and executes the device drivers recorded in the second ROM 43. The second data storage part 44 is configured of a RAM or the like. The second communication part 45 executes communication with the main controller 31.

The first motor drive circuit 46 controls driving of the first motor 22A which is a drive source for the shoulder joint (2D in FIG. 2) based on a control signal created in the second CPU 42. The second motor drive circuit 47 controls driving of the second motor 22B which is a drive source for the elbow joint (2F in FIG. 2) based on a control signal created in the second CPU 42. The lifting motor drive circuit 48 controls driving of the lifting motor 84 which is a drive source for the lifting part (4 in FIG. 2) based on a control signal created in the second CPU 42.

The lifting brake 83 is structured so as to physically stop rotation of the lifting motor 84 and release the physical stopping. In a case that an external force is applied to the lifting motor 84 from the arm (2 in FIG. 2) when the lifting motor 54 is stopped, the lifting motor 84 may be rotated to lower the lifting part. The lifting brake 83 is a brake which is structured to physically prevent rotation of the lifting motor 84 in a stopped state due to an external force. The second CPU 42 controls on (rotation stop) and off (release of rotation stop) of the lifting brake 83.

The first temperature sensor 81 outputs a detected result of temperature of the shoulder joint (2D in FIG. 2) of the industrial robot 1 as shoulder joint temperature data. The second temperature sensor 82 outputs a detected result of temperature of the elbow joint (2F in FIG. 2) of the industrial robot 1 as elbow joint temperature data.

The second CPU 42 periodically acquires shoulder joint temperature data which are outputted from the first temperature sensor 81. Further, the second CPU 42 periodically acquires elbow joint temperature data which are outputted from the second temperature sensor 82. When the shoulder joint temperature data exceed a predetermined threshold value or, when the elbow joint temperature data exceed a predetermined threshold value, the second CPU 42 transmits a temperature error signal to the main controller 31 through the second communication part 45.

Figure 13:
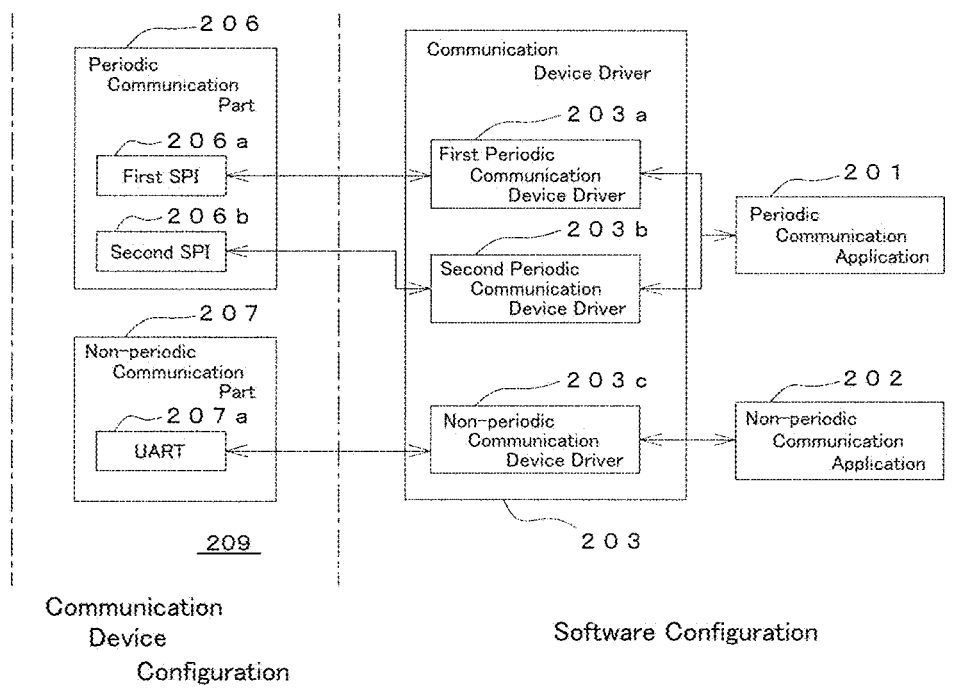
FIG. 13 is a configuration view showing a communication device configuration and a software configuration for executing common periodic communication and non-periodic communication.
Figure 14:
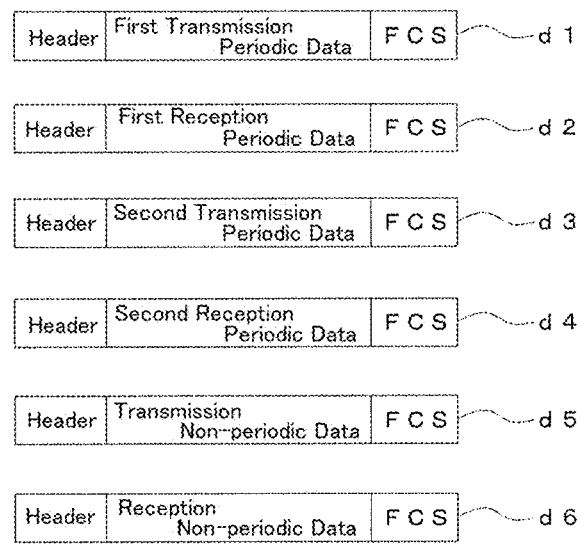
FIG. 14 is an explanatory configuration view showing configurations of various data sets which are handled in the example shown in FIG. 13.

FIG. 13 is a configuration view showing a communication device configuration and a software configuration for executing common periodic communication and non-periodic communication. FIG. 14 is an explanatory configuration view showing configurations of various data sets which are handled in the example shown in FIG. 13.

In FIG. 13, the communication device configuration is configured of a communication part 209. The communication part 209 includes a periodic communication part 206 and a non-periodic communication part 207. The periodic communication part 206 includes a first SPI 206*a* configured to perform periodic communication and a second SPI 206*b* configured to perform periodic communication separately from the first SPI 206*a*. The non-periodic communication part 207 includes UART (Universal Asynchronous Receiver/Transmitter) 207*a* configured to perform non-periodic communication.

In the example shown in FIG. 13, as shown in FIG. 14, a first transmission periodic data set "d1", a first reception periodic data set "d2", a second transmission periodic data set "d3", a second reception periodic data set "d4", a transmission non-periodic data set "d5" and a reception non-periodic data set "d6" are used. The first transmission periodic data set "d1" consists of a header, first transmission periodic data and an FCS (Frame Check Sequence). The first reception periodic data set "d2" consists of a header, first reception periodic data and an FCS. The second transmission periodic data set "d3" consists of a header, second transmission periodic data and an FCS. The second reception periodic data set "d4" consists of a header, second reception periodic data and an FCS. The transmission non-periodic data set "d5" consists of a header, transmission non-periodic data and an FCS. The reception non-periodic data set "d6" consists of a header, reception non-periodic data and an FCS.

The software configuration shown in FIG. 13 includes a periodic communication application 201, a non-periodic communication application 202 and a communication device driver 203. Further, the communication device driver 203 includes a first periodic communication device driver 203*a*, a second periodic communication device driver 203*b* and a non-periodic communication device driver 203*c*. The first transmission periodic data set ("d1" in FIG. 14) periodically created by execution of the periodic communication application 201 is outputted from the first SPI 206*a* through execution of the first periodic communication device driver 203*a*. Further, the first reception periodic data set ("d2" in FIG. 14) periodically received by the first SPI 206*a* is received by the CPU through execution of periodic communication application 201.

The second transmission periodic data set ("d3" in FIG. 14) periodically created by execution of the periodic communication application 201 is outputted from the second SPI 206*b* through execution of the second periodic communication device driver 203*b*. Further, the second reception periodic data set ("d4" in FIG. 14) periodically received by the second SPI 206*b* is received by the CPU through execution of periodic communication application 201.

The transmission non-periodic data set ("d5" in FIG. 14) non-periodically created by execution of the non-periodic communication application 202 is outputted from the UART 207*a* through execution of the non-periodic communication device driver 203*c*. Further, the reception non-periodic data set ("d6" in FIG. 14) non-periodically received by the UART 207*a* is received by the CPU through execution of the non-periodic communication device driver 203*c*.

In the example shown in FIG. 13, it is assumed that a communication device configuration is different from the precedent communication device configuration due to a design change. In this case, it may occur that the source code of the periodic communication application 201 is required to be changed or, the source code of the non-periodic communication application 202 is required to be changed and, as a result, large time and labor may be required.

Figure 4:
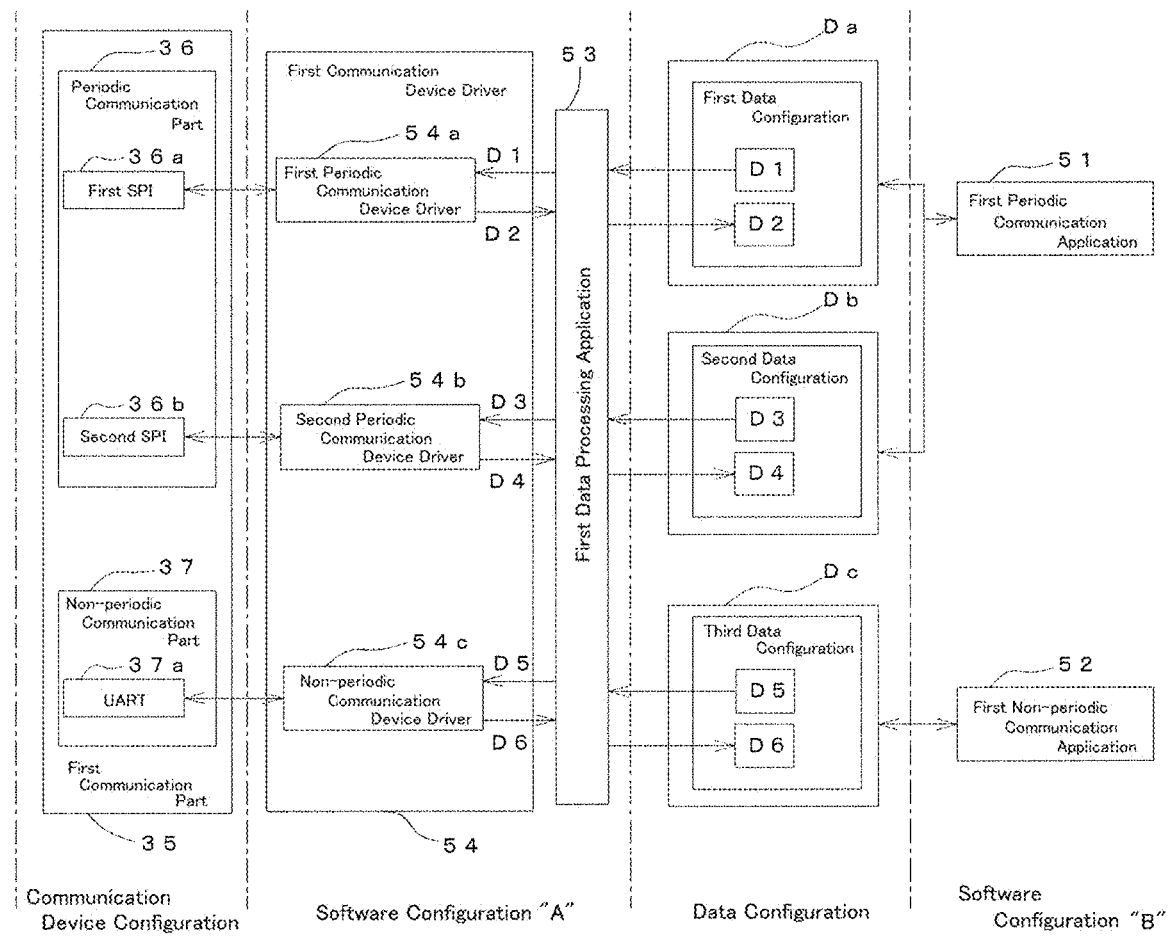
FIG. 4 is a configuration view showing a first example of various configurations in a main controller of a robot controller in the industrial robot.
Figure 5:
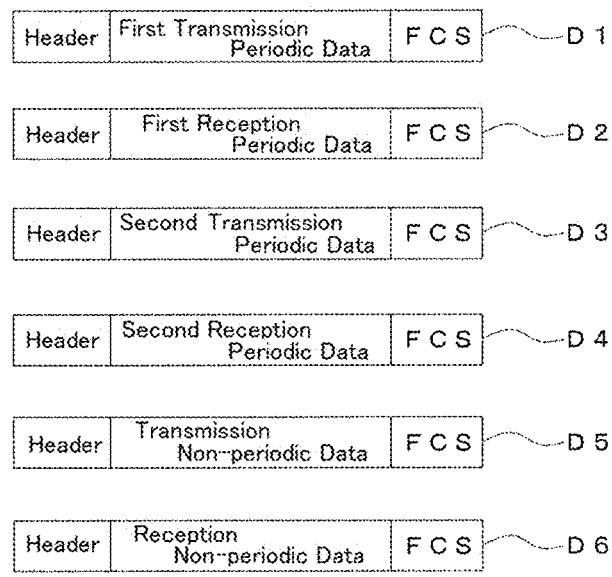
FIG. 5 is an explanatory configuration view showing configurations of various data sets which are handled by the configuration in the first example.

FIG. 4 is a configuration view showing a first example of various configurations in the main controller (31 in FIG. 3) of the robot controller (30 in FIG. 3) in accordance with an embodiment of the present invention. FIG. 5 is an explanatory configuration view showing configurations of various data sets which are handled by the configuration in the first example.

In FIG. 4, the communication device configuration consists of the first communication part 35. The first communication part 35 includes a periodic communication part 36 and a non-periodic communication part 37. The periodic communication part 36 includes a first SPI 36*a* configured to perform periodic communication and a second SPI 36*b* configured to perform periodic communication separately from the first SPI 36*a*. The non-periodic communication part 37 includes a UART 37*a* configured to perform non-periodic communication.

In the first example shown in FIG. 4, as shown in FIG. 5, a first transmission periodic data set "D1", a first reception periodic data set "D2", a second transmission periodic data set "D3", a second reception periodic data set "D4", a transmission non-periodic data set "D5" and a reception non-periodic data set "D6" are handled. The first transmission periodic data set "D1" consists of a header, first transmission periodic data and an FCS. The first reception periodic data set "D2" consists of a header, first reception periodic data and an FCS. The second transmission periodic data set "D3" consists of a header, second transmission periodic data and an FCS. The second reception periodic data set "D4" consists of a header, second reception periodic data and an FCS. The transmission non-periodic data set "D5" consists of a header, transmission non-periodic data and an FCS. The reception non-periodic data set "D6" consists of a header, reception non-periodic data and an FCS.

A software configuration in the first example shown in FIG. 4 includes a software configuration "A" and a software configuration "B". The software configuration "A" consists of a first data processing application 53 and a first communication device driver 54. Further, the software configuration "B" consists of a first periodic communication application 51 and a first non-periodic communication application 52.

The first communication device driver 54 includes a first periodic communication device driver 54a, a second periodic communication device driver 54b and a non-periodic communication device driver 54c. The first transmission periodic data set "D1" periodically created by execution of the first periodic communication application 51 is recorded in a first transmission queue in an inside of the first data storage part (34 in FIG. 3) through execution of the first data processing application 53. Further, the first reception periodic data set "D2" periodically received by the first SPI 36a is written into a first reception queue in the inside of the first data storage part through execution of the first periodic communication device driver 54a.

The first transmission queue is a data FIFO (fast-in fast-out) type transmission periodic data list. Further, the first reception queue is a data FIFO (fast-in fast-out) type reception periodic data list. Further, the data FIFO type is a type in which new data are added to a tail of a data list and the leading data of the data list are read to be outputted and erased.

The second transmission periodic data set "D3" periodically created by execution of the first periodic communication application 51 is recorded in a second transmission queue in the inside of the first data storage part (34 in FIG. 3) through execution of the second periodic communication device driver 54b. Further, the second reception periodic data set "D4" periodically received by the second SPI 36b is written into a second reception queue in the inside of the first data storage part through execution of the second periodic communication device driver 54b. The second transmission queue is a data FIFO (fast-in fast-out) type transmission periodic data list, and the second reception queue is a data FIFO type reception periodic data list.

The transmission non-periodic data set "D5" non-periodically created by execution of the first non-periodic communication application 52 is recorded in a third transmission queue in the inside of the first data storage part (34 in FIG. 3) through execution of the non-periodic communication device driver 54c. Further, the reception non-periodic data set "D6" non-periodically received by the UART 37a is written into a third reception queue in the inside of the first data storage part through execution of the non-periodic communication device driver 54c. The third transmission queue is a data FIFO (fast-in fast-out) type transmission non-periodic data list, and the third reception queue is a data FIFO type reception non-periodic data list.

The first data processing application 53 transfers the first transmission periodic data set "D1" periodically created by execution of the first periodic communication application 51 to the first periodic communication device driver 54a as it is. Further, the first data processing application 53 transfers the second transmission periodic data set "D3" periodically created by execution of the first periodic communication application 51 to the second periodic communication device driver 54b as it is. Further, the first data processing application 53 transfers the transmission non-periodic data set "D5" non-periodically created by execution of the first non-periodic communication application 52 to the non-periodic communication device driver 54c as it is. Further, the first data processing application 53 separates the leading first reception periodic data set "D2" of the first reception queue from the first reception queue to transfer to the first periodic communication application 51. Further, the first data processing application 53 separates the leading second reception periodic data set "D4" of the second reception queue from the second reception queue to transfer to the first periodic communication application 51. Further, the first data processing application 53 separates the leading reception non-periodic data set "D6" of the third reception queue from the third reception queue to transfer to the first non-periodic communication application 52.

The leading first transmission periodic data set "D1" in the first transmission queue in the inside of the first data storage part (34 in FIG. 3) is separated from the first transmission queue and is outputted from the first SPI 36a through execution of the first periodic communication device driver 54a. Further, the leading second transmission periodic data set "D3" in the second transmission queue in the inside of the first data storage part is separated from the second transmission queue and is outputted from the second SPI 36b through execution of the second periodic communication device driver 54b. Further, the leading transmission non-periodic data set "D5" in the third transmission queue in the inside of the first data storage part is separated from the third transmission queue and is outputted from the UART 37a through execution of the non-periodic communication device driver 54c.

Names of various data sets shown in FIG. 5 are expressed with the main controller (31 in FIG. 3) as a reference. In a case that the names of the data sets are expressed with the sub controller (41 in FIG. 3) as a reference, the names are expressed so that transmission and reception are reversed in FIG. 5. Specifically, in a case of the expression with the sub controller as a reference, the first transmission periodic data set "D1" in FIG. 5 is expressed as a first reception periodic data set. Further, the first reception periodic data set "D2" in FIG. 5 is expressed as a first transmission periodic data set. Further, the second transmission periodic data set "D3" in FIG. 5 is expressed as a second reception periodic data set. Further, the second reception periodic data set "D4" in FIG. 5 is expressed as a second transmission periodic data set. Further, the transmission non-periodic data set "D5" in FIG. 5 is expressed as a reception non-periodic data set. Further, the reception non-periodic data set "D6" in FIG. 5 is expressed as a transmission non-periodic data set. In the following descriptions, in order to easily understand, the names of the various data sets are expressed with the main controller as a reference.

Figure 6:
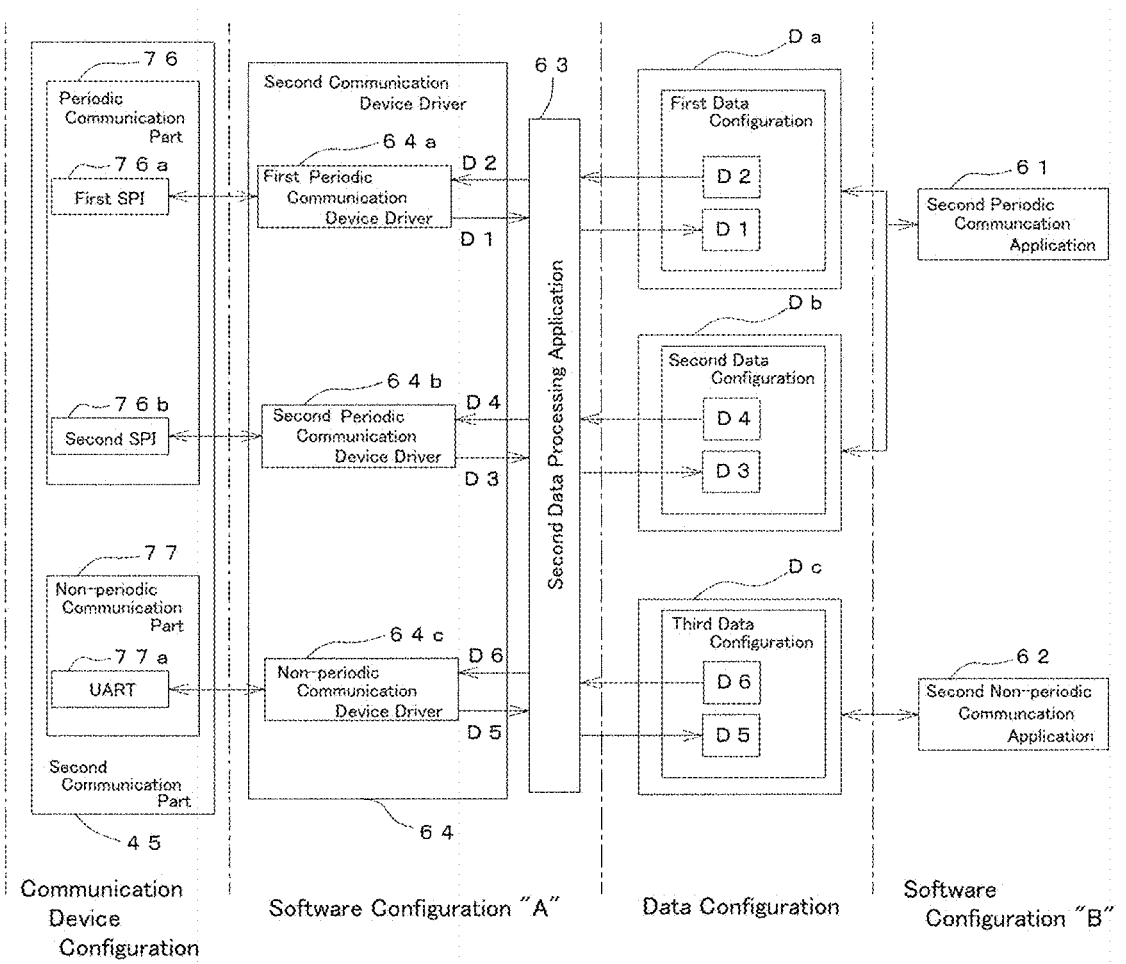
FIG. 6 is a configuration view showing a first example of various configurations in a sub controller of the robot controller.

FIG. 6 is a configuration view showing a first example of various configurations of the sub controller (41 in FIG. 3) in the robot controller (30 in FIG. 3) in accordance with an embodiment of the present invention.

In FIG. 6, a communication device configuration consists of a second communication part 45. The second communication part 45 includes a periodic communication part 76 and a non-periodic communication part 77. The periodic communication part 76 includes a first SPI 76a configured to perform periodic communication and a second SPI 76b configured to perform periodic communication separately from the first SPI 76a. The non-periodic communication part 77 includes a UART 77a configured to perform non-periodic communication.

A software configuration in the first example shown in FIG. 6 includes a software configuration "A" and a software configuration "B". The software configuration "A" consists of a second data processing application 63 and a second communication device driver 64. Further, the software configuration "B" consists of a second periodic communication application 61 and a second non-periodic communication application 62.

The second communication device driver 64 includes a first periodic communication device driver 64a, a second periodic communication device driver 64b and a non-periodic communication device driver 64c. The first reception periodic data set "D2" periodically created by execution of the second periodic communication application 61 is recorded in a first transmission queue in an inside of the second data storage part (44 in FIG. 3) through execution of the first periodic communication device driver 64a. Further, the first transmission periodic data set "D1" periodically received by the first SPI 76a is written in a first reception queue in the inside of the second data storage part through execution of the first periodic communication device driver 64a.

The second reception periodic data set "D4" periodically created by execution of the second periodic communication application 61 is recorded in a second transmission queue in the inside of the second data storage part (44 in FIG. 3) through execution of the second periodic communication device driver 64b. Further, the second transmission periodic data set "D3" periodically received by the second SPI 76b is written in a second reception queue in the inside of the second data storage part through execution of the second periodic communication device driver 64b.

The reception non-periodic data set "D6" non-periodically created by execution of the second non-periodic communication application 62 is recorded in a third transmission queue in the inside of the second data storage part (44 in FIG. 3) through execution of the non-periodic communication device driver 64c. Further, the transmission non-periodic data set "D5" non-periodically received by the UART 77a is written in a third reception queue in the inside of the second data storage part through execution of the non-periodic communication device driver 64c.

The second data processing application 63 transfers the first reception periodic data set "D2" periodically created by execution of the second periodic communication application 61 to the first periodic communication device driver 64a as it is. Further, the second data processing application 63 transfers the second reception periodic data set "D4" periodically created by execution of the second periodic communication application 61 to the second periodic communication device driver 64b as it is. Further, the second data processing application 63 transfers the reception non-periodic data set "D6" non-periodically created by execution of the second non-periodic communication application 62 to the non-periodic communication device driver 64c as it is.

Further, the second data processing application 63 separates the leading first transmission periodic data set "D1" of the first reception queue from the first reception queue to transfer to the second periodic communication application 61. Further, the second data processing application 63 separates the leading second transmission periodic data set "D3" of the second reception queue from the second reception queue to transfer to the second periodic communication application 61. Further, the second data processing application 63 separates the leading transmission non-periodic data set "D5" of the third reception queue from the third reception queue to transfer to the second non-periodic communication application 62.

The leading first reception periodic data set "D2" in the first transmission queue in the inside of the second data storage part (44 in FIG. 3) is separated from the first transmission queue and is outputted from the first SPI 76a through execution of the first periodic communication device driver 64a. Further, the leading second reception periodic data set "D4" in the second transmission queue in the inside of the second data storage part is separated from the second transmission queue and is outputted from the second SPI 76b through execution of the second periodic communication device driver 64b. Further, the leading reception non-periodic data set "D6" in the third transmission queue in the inside of the second data storage part is separated from the third transmission queue and is outputted from the UART 77a through execution of the non-periodic communication device driver 64c.

Figure 7:
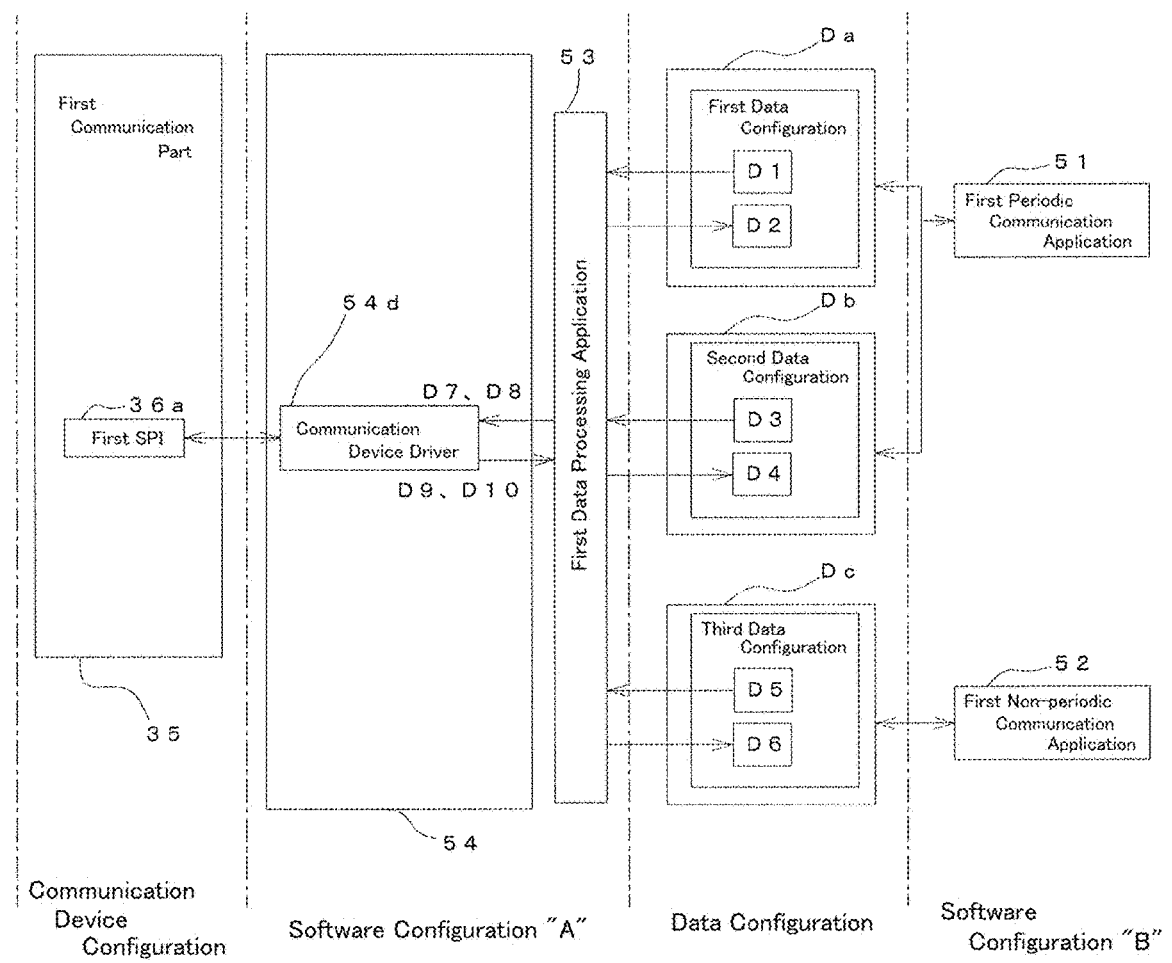
FIG. 7 is a configuration view showing a second example of various configurations in the main controller of the robot controller.
Figure 8:
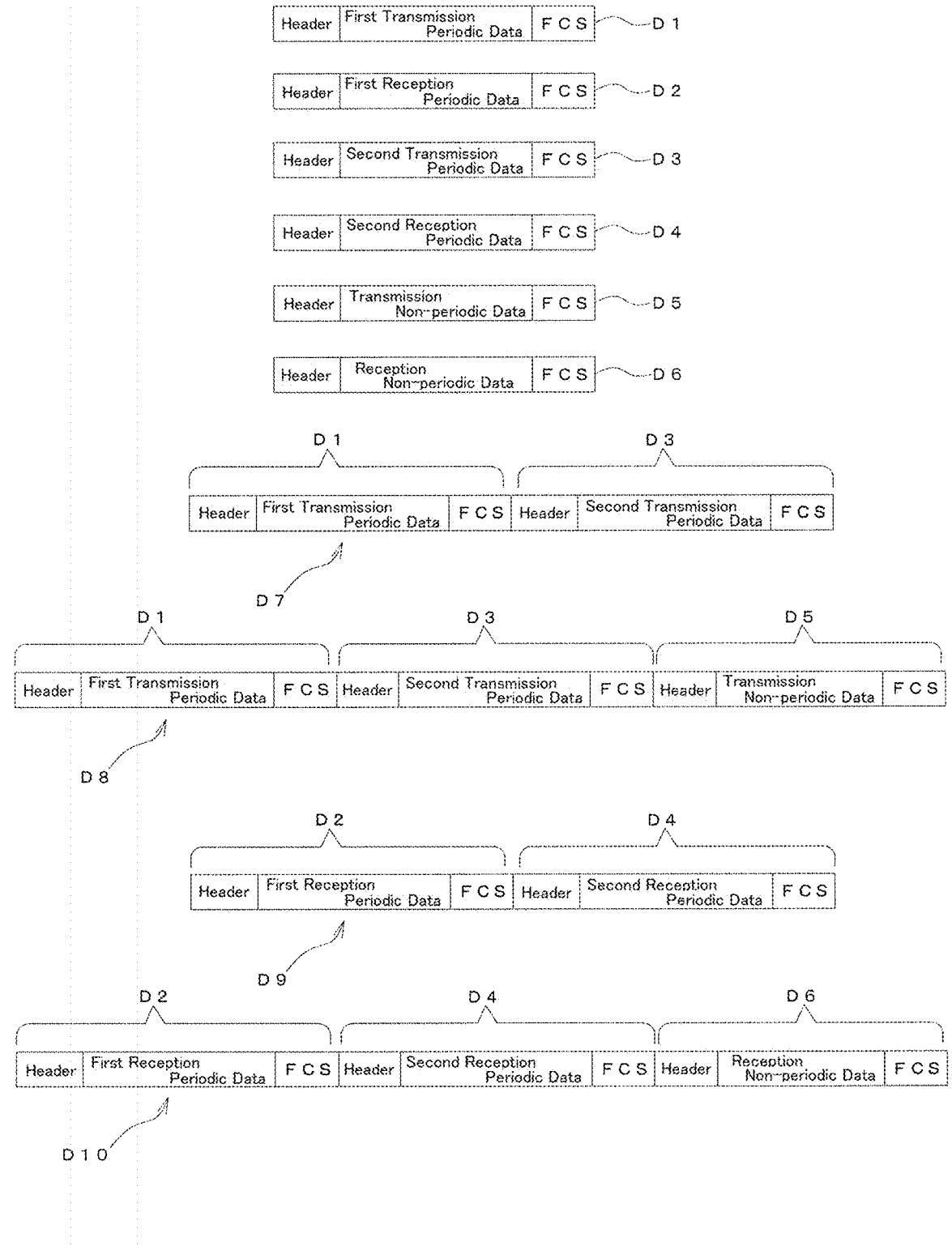
FIG. 8 is an explanatory configuration view showing configurations of various data sets which are handled by the configuration in the second example.

FIG. 7 is a configuration view showing a second example of various configurations in the main controller (31 in FIG. 3) of the robot controller (30 in FIG. 3) in accordance with an embodiment of the present invention. FIG. 8 is an explanatory configuration view showing configurations of various data sets which are handled by the configuration in the second example.

In the second example shown in FIG. 7, as shown in FIG. 8, a first transmission periodic data set "D1", a first reception periodic data set "D2", a second transmission periodic data set "D3", a second reception periodic data set "D4", a transmission non-periodic data set "D5" and a reception non-periodic data set "D6" are handled. In addition, a first transmission integrated data set "D7", a second transmission integrated data set "D8" a first reception integrated data set "D9" and a second reception integrated data set "D10" are handled.

In FIG. 8, the first transmission periodic data set "D1", the first reception periodic data set "D2", the second transmission periodic data set "D3", the second reception periodic data set "D4", the transmission non-periodic data set "D5" and the reception non-periodic data set "D6" are respectively the same as those shown in FIG. 5.

The first transmission integrated data set "D7" consists of the first transmission periodic data set "D1" and the second transmission periodic data set "D3" which is combined at the end of the first transmission periodic data set "D1". The second transmission integrated data set "D8" consists of the first transmission periodic data set "D1", the second transmission periodic data set "D3" combined at the end of the first transmission periodic data set "D1", and the transmission non-periodic data set "D5" combined at the end of the second transmission periodic data set "D3". The first reception integrated data set "D9" consists of the first reception periodic data set "D2" and the second reception periodic data set "D4" combined at the end of the first reception periodic data set "D2". The second reception integrated data set "D10" consists of the first reception periodic data set "D2", the second reception periodic data set "D4" combined at the end of the first reception periodic data set "D2", and the reception non-periodic data set "D6" combined at the end of the second reception periodic data set "D4".

Names of various data sets shown in FIG. 8 are expressed with the main controller (31 in FIG. 3) as a reference. In a case that the names of the data sets are expressed with the sub controller (41 in FIG. 3) as a reference, their names are expressed so that transmission and reception are reversed in FIG. 8. Specifically, in a case of the expression with the sub controller as a reference, the first transmission integrated data set "D7" in FIG. 8 is expressed as a first reception integrated data set. Further, the second transmission integrated data set "D8" shown in FIG. 8 is expressed as a second reception integrated data set. Further, the first reception integrated data set "D9" shown in FIG. 8 is expressed as a first transmission integrated data set. Further, the second reception integrated data set "D10" shown in FIG. 8 is expressed as a second transmission integrated data set. In the following descriptions, in order to easily understand, the names of the various data sets are expressed with the main controller as a reference.

Next, the second example shown in FIG. 7 will be described below regarding only configurations different from the first example shown in FIG. 4. In FIG. 7, the communication device configuration consists of a first communication part 35. The first communication part 35 includes only a first SPI 36a as a communication device. The software configuration includes a software configuration "A" and a software configuration "B". The software configuration "A" consists of a first data processing application 53 and a first communication device driver 54. Further, the software configuration "B" consists of a first periodic communication application 51 and a first non-periodic communication application 52.

The first communication device driver 54 includes only a communication device driver 54d as a device driver. The first transmission periodic data set "D1" periodically created by execution of the first periodic communication application 51 is recorded in a first transmission queue in an inside of the first data storage part (34 in FIG. 3) through execution of the first data processing application 53. Further, the first reception periodic data set "D2" periodically received by the first SPI 36a is written in a first reception queue in the inside of the first data storage part through execution of the communication device driver 54d.

The second transmission periodic data set "D3" periodically created by execution of the first periodic communication application 51 is recorded in a second transmission queue in the inside of the first data storage part (34 in FIG. 3) through execution of the communication device driver 54d. Further, the second reception periodic data set "D4" periodically received by the first SPI 36a is written in a second reception queue in the inside of the first data storage part through execution of the communication device driver 54d.

The transmission non-periodic data set "D5" non-periodically created by execution of the first non-periodic communication application 52 is recorded in a third transmission queue in the inside of the first data storage part (34 in FIG. 3) through execution of the communication device driver 54d. Further, the reception non-periodic data set "D6" non-periodically received by the first SPI 36a is written in the third reception queue in the inside of the first data storage part through execution of the communication device driver 54d.

The first data processing application 53 integrates the first transmission periodic data set "D1" and the second transmission periodic data set "D3", which are created by execution of the first periodic communication application 51, to process into the first transmission integrated data set "D7" and transfer it to the communication device driver 54d. Further, the first data processing application 53 processes the first transmission periodic data set "D1", the second transmission periodic data set "D3", and the transmission non-periodic data set "D5" created by execution of the first non-periodic communication application 52. Specifically, the first data processing application 53 integrates the first transmission periodic data set "D1", the second transmission periodic data set "D3" and the transmission non-periodic data set "D5" to process into the second transmission integrated data set "D8" and transfer it to the communication device driver 54d. Further, the first data processing application 53 divides the first reception integrated data set "D9" received by the first SPI 36a to process into the first reception periodic data set "D2" and the second reception periodic data set "D4" and transfer them to the first data processing application 53. Further, the first data processing application 53 divides the second reception integrated data set "D10" received by the first SPI 36a to process into the first reception periodic data set "D2", the second reception periodic data set "D4" and the reception non-periodic data set "D6" and transfer them to the first data processing application 53.

Figure 9:
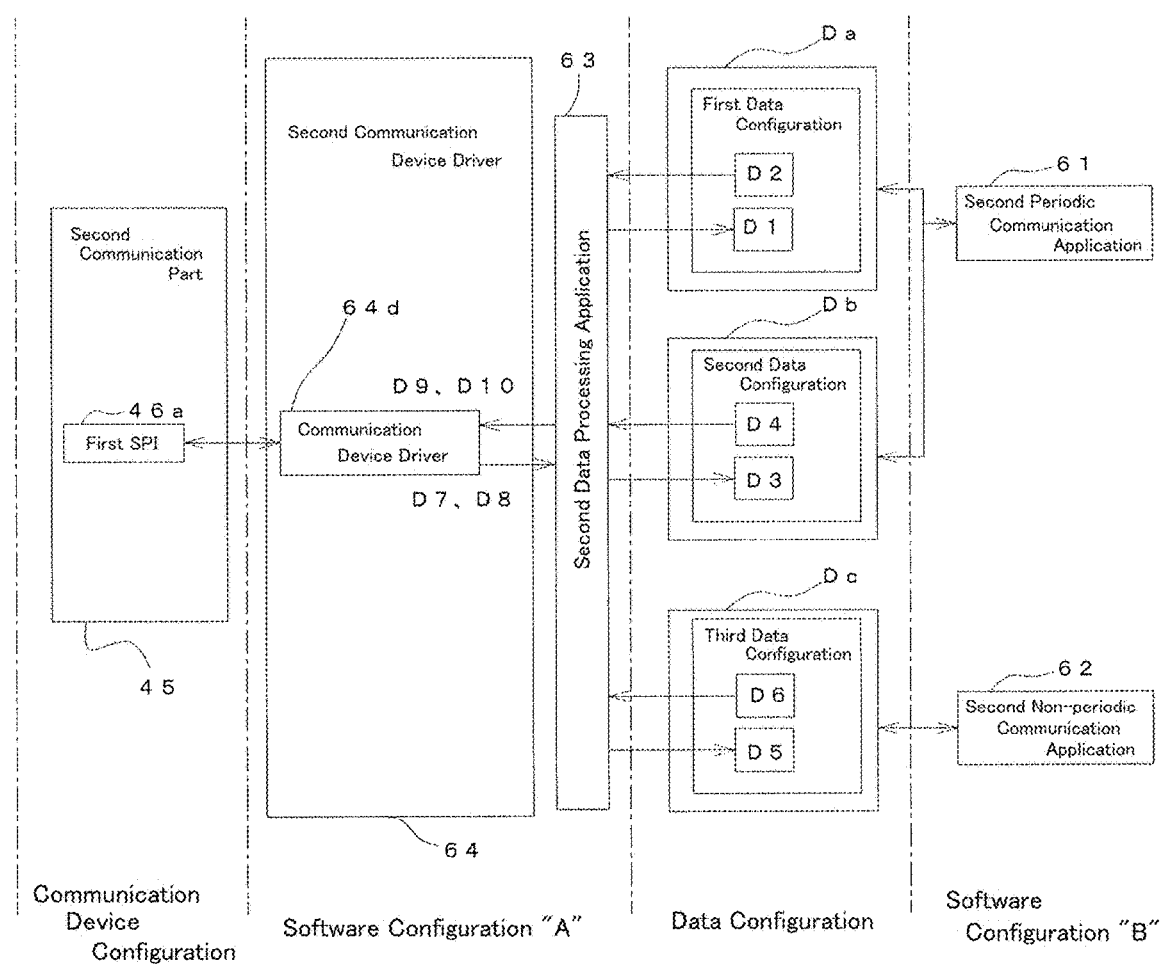
FIG. 9 is a configuration view showing a second example of various configurations in the sub controller of the robot controller.

FIG. 9 is a configuration view showing a second example of various configurations in the sub controller (41 in FIG. 3) of the robot controller (30 in FIG. 3) in accordance with an embodiment of the present invention. Next, the second example shown in FIG. 9 will be described below regarding only configurations different from the first example shown in FIG. 6.

In FIG. 9, a communication device configuration consists of a second communication part 45. The second communication part 45 includes only a first SPI 46a as a communication device. A software configuration includes a software configuration "A" and a software configuration "B". The software configuration "A" consists of a second data processing application 63 and a second communication device driver 64. Further, the software configuration "B" consists of a second periodic communication application 61 and a second non-periodic communication application 62.

The second communication device driver 64 includes only a communication device driver 64d as a device driver. The first reception periodic data set "D2" periodically created by execution of the second periodic communication application 61 is recorded in a first transmission queue in an inside of the second data storage part (44 in FIG. 3) through execution of the second data processing application 63. Further, the first transmission periodic data set "D1" periodically received by the first SPI 46a is written in a first reception queue in the inside of the first data storage part through execution of the communication device driver 64d.

The second reception periodic data set "D4" periodically created by execution of the second periodic communication application 61 is recorded in a second transmission queue in an inside of the second data storage part (44 in FIG. 3) through execution of the communication device driver 64d. Further, the second transmission periodic data set "D3" periodically received by the first SPI 46a is written in a second reception queue in the inside of the second data storage part through execution of the communication device driver 64d.

The reception non-periodic data set "D6" non-periodically created by execution of the second non-periodic communication application 62 is recorded in a third transmission queue in the inside of the second data storage part (44 in FIG. 3) through execution of the communication device driver 64d. Further, the transmission non-periodic data set "D5" non-periodically received by the first SPI 46a is written in a third reception queue in the inside of the second data storage part through execution of the communication device driver 64d.

The second data processing application 63 integrates the first reception periodic data set "D2" and the second reception periodic data set "D4", which are created by execution of the second periodic communication application 61, to process into the first reception integrated data set "D9" and transfer it to the communication device driver 64d. Further, the second data processing application 63 processes the first reception periodic data set "D2", the second reception periodic data set "D4" and the reception non-periodic data set "D6" created by execution of the second non-periodic communication application 62. Specifically, the second data processing application 63 integrates the first reception periodic data set "D2", the second reception periodic data set "D4" and the reception non-periodic data set "D6" to process into the second reception integrated data set "D10" and transfer it to the communication device driver 64d. Further, the second data processing application 63 divides the first transmission integrated data set "D7" received by the first SPI 46a to process into the first transmission periodic data set "D1" and the second transmission periodic data set "D3" and transfer them to the second data processing application 63. Further, the second data processing application 63 divides the second transmission integrated data set "D8" received by the first SPI 46a to process into the first transmission periodic data set "D1", the second transmission periodic data set "D3" and the transmission non-periodic data set "D5" and transfer them to the second data processing application 63.

Figure 10:
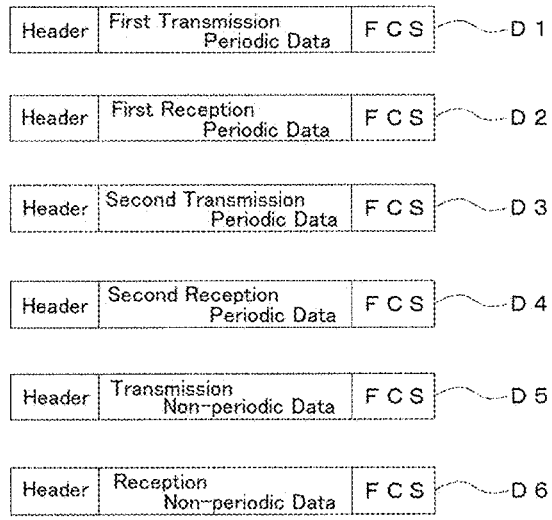
FIG. 10 is an explanatory configuration view showing modified configurations of various data sets which are handled by the configuration in the second example.
Figure 10:
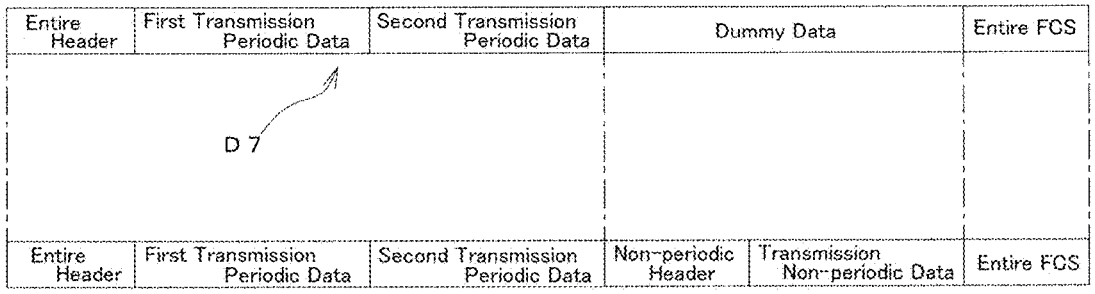
Figure 10:
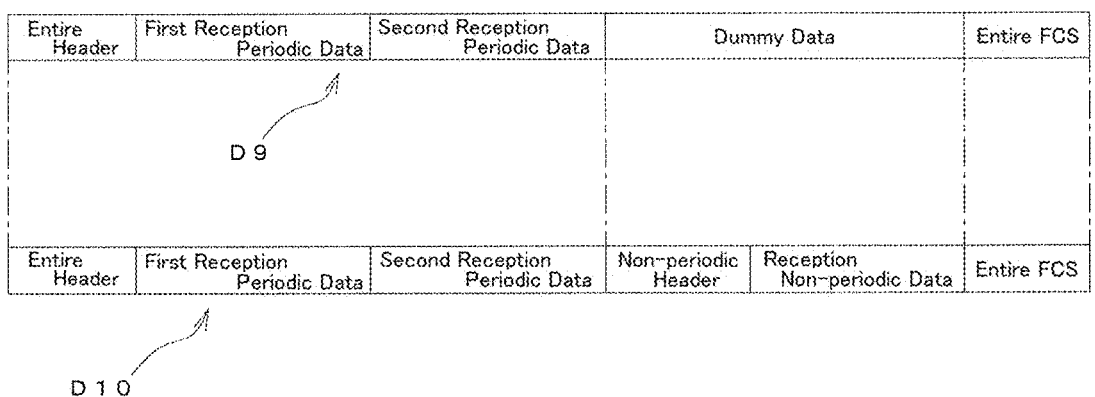

In accordance with an embodiment of the present invention, the first transmission integrated data set "D7", the second transmission integrated data set "D8", the first reception integrated data set "D9" and the second reception integrated data set "D10" may be configured as shown in FIG. 10 instead of those shown in FIG. 8. Specifically, in a case that transmission non-periodic data are created by the first non-periodic communication application (52 in FIG. 7), the first data processing application (53 in FIG. 7) creates a second transmission integrated data set "D8" shown in FIG. 10. The second transmission integrated data set "D8" includes an entire header, the first transmission periodic data, the second transmission periodic data, non-periodic header, the transmission non-periodic data and an entire FCS. The entire header is a header for the entire second transmission integrated data set "D8". The non-periodic header is a header for the transmission non-periodic data. The entire FCS is an FCS for the entire second transmission integrated data set "D8". Each of the entire header and the entire FCS is configured by the first data processing application.

On the other hand, in a case that transmission non-periodic data are not created by the first non-periodic communication application (52 in FIG. 7), the first data processing application (53 in FIG. 7) creates the first transmission integrated data set "D7" shown in FIG. 10. The first transmission integrated data set "D7" includes an entire header, the first transmission periodic data, the second transmission periodic data, dummy data and an entire FCS.

The dummy data are data for setting an entire length of the first transmission integrated data set "D7" to be the same as an entire length of the second transmission integrated data set "D8", and the dummy data are configured by the first data processing application. A length of the dummy data is the same as a total value of a length of the non-periodic header and a length of the transmission non-periodic data of the second transmission integrated data set "D8".

Further, in a case that reception non-periodic data are created by the second non-periodic communication application (62 in FIG. 9), the second data processing application (63 in FIG. 9) creates the second reception integrated data set "D10" shown in FIG. 10. The second reception integrated data set "D10" includes an entire header, the first reception periodic data, the second reception periodic data, a non-periodic header, the reception non-periodic data and an entire FCS. The entire header is a header for the entire second reception integrated data set "D10". The non-periodic header is a header for the reception non-periodic data. The entire FCS is an FCS for the entire second reception integrated data set "D10". Each of the entire header and the entire FCS is configured by the second data processing application.

On the other hand, in a case that reception non-periodic data are not generated by the second non-periodic communication application (62 in FIG. 7), the second data processing application (63 in FIG. 9) creates the first reception integrated data set "D9" shown in FIG. 10. The first reception integrated data set "D9" includes an entire header, the first reception periodic data, the second reception periodic data, dummy data and an entire FCS. The dummy data are data for setting an entire length of the first reception integrated data set "D9" to be the same as an entire length of the second reception integrated data set "D10", and the dummy data are configured by the second data processing application. A length of the dummy data is the same as a total value of a length of the non-periodic header and a length of the reception non-periodic data of the second reception integrated data set "D10".

Figure 11:
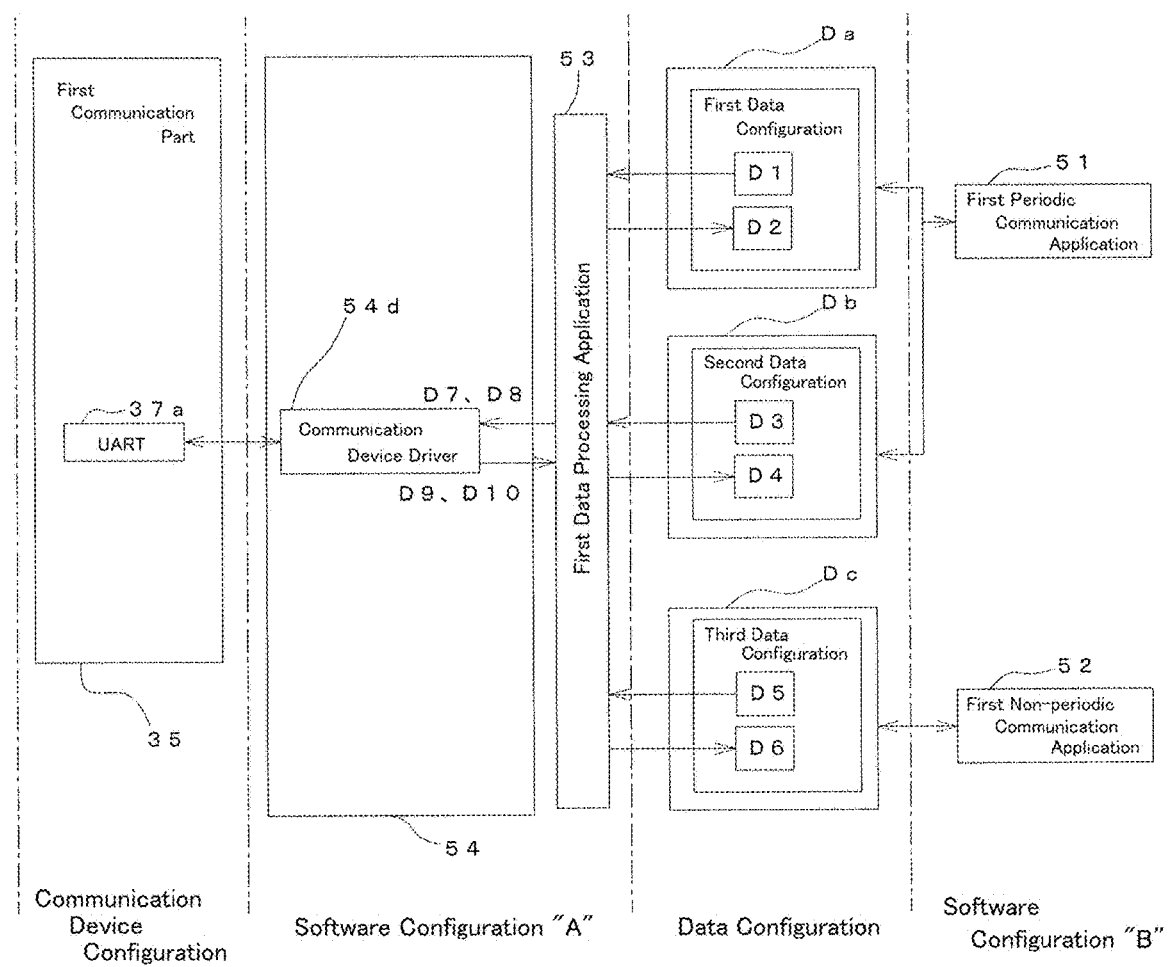
FIG. 11 is a configuration view showing a third example of various configurations in the main controller of the robot controller.

FIG. 11 is a configuration view showing a third example of various configurations in the main controller (31 in FIG. 3) of the robot controller (30 in FIG. 3) in accordance with an embodiment of the present invention. The third example is similarly configured to the second example shown in FIG. 7 except that a UART 37a is provided instead of the first SPI.

By comparing FIG. 11 with FIG. 4 and FIG. 7, in the main controller (31 in FIG. 3) of the robot controller (30 in FIG. 3) in accordance with this embodiment, even when a communication device configuration is changed, processing contents of the first periodic communication application 51 are not changed. In addition, similarly, processing contents of the first non-periodic communication application 52 are not changed. Specifically, the first periodic communication application 51 creates the first transmission periodic data set "D1" having a first data configuration "Da", the second transmission periodic data set "D3" having a second data configuration "Db", and the transmission non-periodic data set "D5" having a third data configuration "Dc" regardless of the communication device configuration. Further, the first periodic communication application 51 refers to the first reception periodic data set "D2" having the first data configuration "Da", the second reception periodic data set "D4" having the second data configuration "Db", and the reception non-periodic data set "D6" having the third data configuration "Dc" regardless of the communication device configuration. In other words, even when the communication device configuration is changed, the source code of the first periodic communication application 51 is not changed. Therefore, according to the main controller (31 in FIG. 3), in a case that the communication device configuration is changed, time and labor of changing the source code of the first periodic communication application 51 and time and labor of changing the source code of the first non-periodic communication application 52 can be reduced (avoided).

In this case, contents of the configuration of the first communication device driver 54 and contents of the first data processing application 53 are required to be changed depending on the communication device configuration. However, each of the first communication device driver 54 and the first data processing application 53 executes typical routine processing. Therefore, time and labor of changing each configuration of the first communication device driver 54 and the first data processing application 53 is reduced in comparison with those of changing of each source code of the first periodic communication application 51 and the first non-periodic communication application 52.

Figure 12:
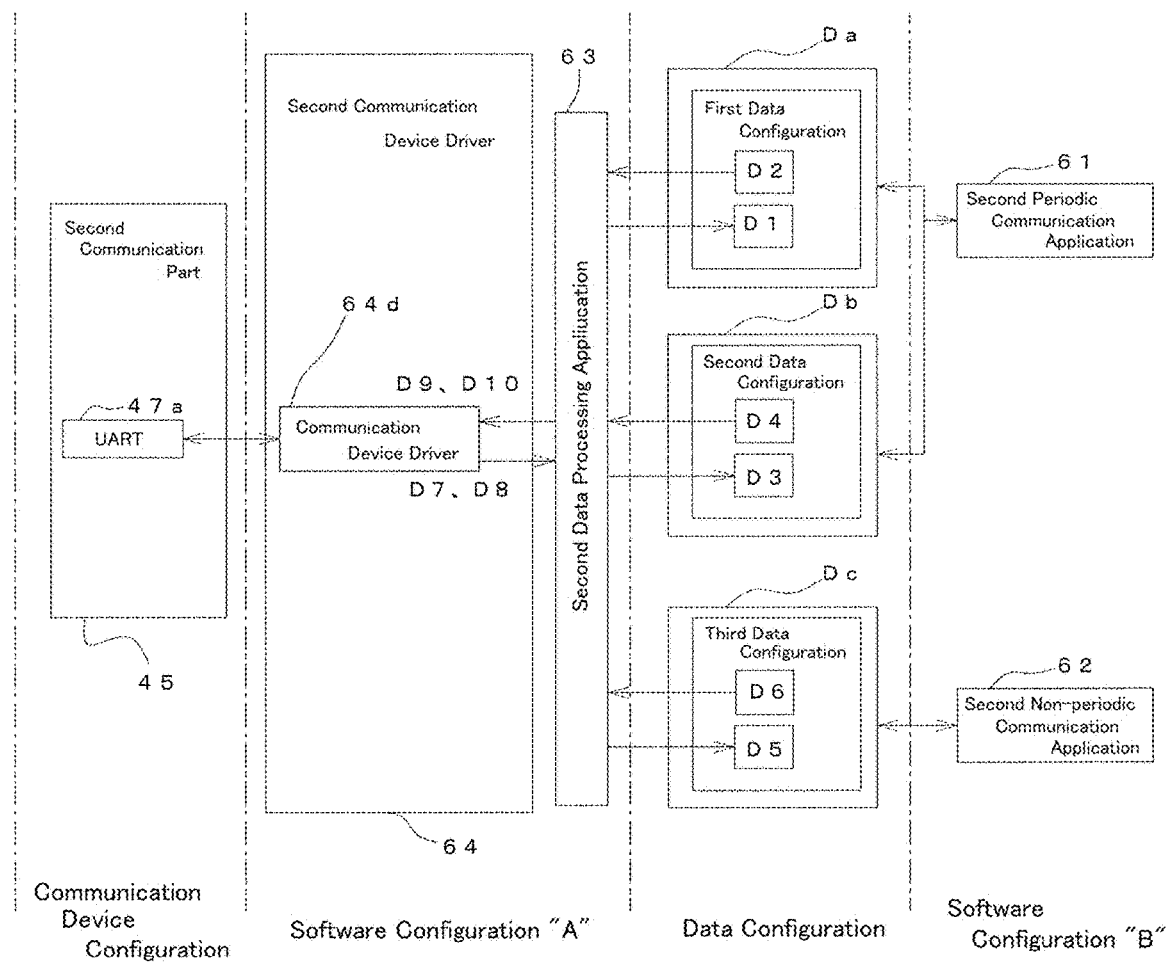
FIG. 12 is a configuration view showing a third example of various configurations in the sub controller of the robot controller.

FIG. 12 is a configuration view showing a third example of various configurations in the sub controller (41 in FIG. 3) of the robot controller (30 in FIG. 3). The third example is similarly configured to the second example shown in FIG. 9 except that a UART 47a is provided instead of the first SPI.

By comparing FIG. 12 with FIG. 6 and FIG. 9, in the sub controller (41 in FIG. 3) of the robot controller (30 in FIG. 3) in accordance with this embodiment, even when the communication device configuration is changed, processing contents of the second periodic communication application 61 are not changed. In addition, similarly, processing contents of the second non-periodic communication application 62 are not changed. Specifically, the second periodic communication application 61 creates the first reception periodic data set "D2" having the first data configuration "Da", the second reception periodic data set "D4" having the second data configuration "Db", and the reception non-periodic data set "D6" having the third data configuration "Dc" regardless of the communication device configuration. Further, the second periodic communication application 61 refers to the first transmission periodic data set "D1" having the first data configuration "Da", the second transmission periodic data set "D3" having the second data configuration "Db", and the transmission non-periodic data set "D5" having the third data configuration "Dc" regardless of the communication device configuration. In other words, even when the communication device configuration is changed, the source code of the second periodic communication application 61 is not changed. Therefore, according to the sub controller (41 in FIG. 3), in a case that the communication device configuration is changed, time and labor of changing the source code of the second periodic communication application 61 and time and labor of changing the source code of the second non-periodic communication application 62 can be reduced (avoided).

Although the present invention has been shown and described with reference to a specific embodiment, various changes and modifications will be apparent to those skilled in the art from the teachings herein. The above-mentioned embodiments are included in a range and summary of the present invention and are also included in the invention described in the claim and its equivalent range.

The present invention provides specific effects for the respective embodiments.

First Embodiment

The first embodiment is characterized in that:
an information processing device comprises a first information processing part (for example, main controller 31) having a first calculation part (for example, first CPU 32), and a second information processing part (for example, sub controller 41) having a second calculation part (for example, second CPU 42), and the first information processing part and the second information processing part are communicated with each other;

the first information processing part includes a first communication part (for example, first communication part 35) which executes communication, and a first data storage part (for example, first data storage part 34) which stores data;

the first calculation part is configured to execute:
a first communication device driver (for example, first communication device driver 54) which is software for making the first communication part execute communication;

a first periodic communication application (for example, first periodic communication application 51) configured to execute first periodic communication in which data for transmission are periodically created and recorded by being added to an FIFO type transmission periodic data list (for example, first transmission queue and second transmission queue) stored in the first data storage part and, in addition, data are read from a reception periodic data list (for example, first reception queue and second reception queue) which is an FIFO type data list periodically received by the first communication part and stored in the first storage part;

a first non-periodic communication application configured to execute first non-periodic communication in which data for transmission are non-periodically created and recorded by being added to an FIFO type transmission non-periodic data list (for example, third transmission queue) stored in the first data storage part and, in addition, data are read from a reception non-periodic data list (for example, third reception queue) which is an FIFO type data list non-periodically received by the first communication part and stored in the first storage part; and a first data processing application configured to process data (for example, first data processing application 53);

the first data processing application integrates the data which are read from the transmission periodic data list stored in the first data storage part (for example, first transmission periodic data set "D1" and second transmission periodic data set "D3") with the data which are read from the transmission non-periodic data list stored in the first data storage part (for example, transmission non-periodic data set "D5") to process into transmission integrated data (for example, second transmission integrated data set "D8"); and the transmission integrated data are transmitted from the first communication part through execution of the first communication device driver.

According to the first embodiment, in a case that the communication device configuration is changed, time and labor of changing the source code of the periodic communication application (first periodic communication application) and time and labor of changing the source code of the non-periodic communication application (first non-periodic communication application) can be reduced (avoided).

Second Embodiment

The second embodiment is characterized in that:

the information processing device comprises the configuration of the first embodiment and, in addition, the first data processing application divides data periodically received by the first communication part (for example, second reception integrated data set "D10") into a plurality of data (for example, first reception periodic data set "D2", second reception periodic data set "D4" and reception non-periodic data set "D6"), and respective divided data are added to reception periodic data lists which are different from each other (for example, second reception queue).

According to the second embodiment, in the first information processing part, a plurality of mutually different type data can be collectively received as one data set.

Third Embodiment

The third embodiment is characterized in that:

the information processing device comprises the configuration of the second embodiment and, in addition, the second information processing part comprises a second communication part which executes communication (for example, second communication part 45) and a second data storage part which stores data (for example, second data storage part 44);

the second calculation part is configured to execute:

a second communication device driver which is software for making the second communication part execute communication (for example, second communication device driver 64);

a second periodic communication application configured to execute second periodic communication in which data for transmission are periodically created and recorded by being added to an FIFO type transmission periodic data list stored in the second data storage part and, in addition, data are read from a reception periodic data list which is an FIFO type data list periodically received by the second communication part and stored in the second storage part (for example, second periodic communication application 61);

a second non-periodic communication application configured to execute second non-periodic communication in which data for transmission are non-periodically created and recorded by being added to an FIFO type transmission non-periodic data list stored in the second data storage part and, in addition, data are read from a reception non-periodic data list which is an FIFO type data list non-periodically received by the second communication part and stored in the second storage part (for example, second non-periodic communication application 62); and a second data processing application configured to process data (for example, second data processing application 63);

the second data processing application integrates the data which are read from the transmission periodic data list stored in the second data storage part with the data which are read from the transmission non-periodic data list stored in the second data storage part to process into transmission integrated data; and the transmission integrated data are transmitted from the second communication part through execution of the second communication device driver.

According to the third embodiment, in a case that the communication device configuration is changed, time and labor of changing the source code of the second periodic communication application and time and labor of changing the source code of the second non-periodic communication application can be reduced (avoided).

Fourth Embodiment

The fourth embodiment is characterized in that:

the information processing device comprises the configuration of the third embodiment and, in addition, the second data processing application divides data periodically received by the second communication part into a plurality of data, and respective divided data are added to reception periodic data lists which are different from each other.

According to the fourth embodiment, in the second information processing part, a plurality of mutually different type data can be collectively received as one data set.

Fifth Embodiment

The fifth embodiment is characterized in that:

an industrial robot comprises an information processing device, and the information processing device is one of the information processing devices defined in the first embodiment through the fourth embodiment.

According to the fifth embodiment, in a case that the communication device configuration is changed, time and labor of changing the source code of the periodic communication application (first periodic communication application) and time and labor of changing the source code of the non-periodic communication application (first non-periodic communication application) can be reduced (avoided).

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An information processing device comprising:
   a first information processing part comprising a first calculation part; and
   a second information processing part comprising a second calculation part;
   wherein the first information processing part and the second information processing part are communicated with each other;
   wherein the first information processing part comprises a first communication part configured to execute communication and a first data storage part configured to store data;
   wherein the first calculation part is configured to execute:
      a first communication device driver which is software for making the first communication part execute communication;
      a first periodic communication application configured to execute first periodic communication in which data for transmission are periodically created and recorded by being added to an FIFO type transmission periodic data list stored in the first data storage part and, in addition, data are read from a reception periodic data list which is an FIFO type data list periodically received by the first communication part and stored in the first storage part;

a first non-periodic communication application configured to execute first non-periodic communication in which data for transmission are non-periodically created and recorded by being added to an FIFO type transmission non-periodic data list stored in the first data storage part and, in addition, data are read from a reception non-periodic data list which is an FIFO type data list non-periodically received by the first communication part and stored in the first storage part; and a first data processing application configured to process data;

wherein the first data processing application integrates the data which are read from the transmission periodic data list stored in the first data storage part with the data which are read from the transmission non-periodic data list stored in the first data storage part to process into transmission integrated data; and wherein the transmission integrated data are transmitted from the first communication part through execution of the first communication device driver.

2. The information processing device according to claim 1, wherein the first data processing application divides data periodically received by the first communication part into a plurality of data, and respective divided data are added to reception periodic data lists which are different from each other.

3. The information processing device according to claim 2, wherein the second information processing part comprises a second communication part which executes communication and a second data storage part which stores data;

the second calculation part is configured to execute:

a second communication device driver which is software for making the second communication part execute communication;

a second periodic communication application configured to execute second periodic communication in which data for transmission are periodically created and recorded by being added to an FIFO type transmission periodic data list stored in the second data storage part and, in addition, data are read from a reception periodic data list which is an FIFO type data list periodically received by the second communication part and stored in the second storage part;

a second non-periodic communication application configured to execute second non-periodic communication in which data for transmission are non-periodically created and recorded by being added to an FIFO type transmission non-periodic data list stored in the second data storage part and, in addition, data are read from a reception non-periodic data list which is an FIFO type data list non-periodically received by the second communication part and stored in the second storage part; and a second data processing application configured to process data;

wherein the second data processing application integrates the data which are read from the transmission periodic data list stored in the second data storage part with the data which are read from the transmission non-periodic data list stored in the second data storage part to process into transmission integrated data; and wherein the transmission integrated data are transmitted from the second communication part through execution of the second communication device driver.

4. The information processing device according to claim 3, wherein the second data processing application divides data periodically received by the second communication part into a plurality of data, and respective divided data are added to reception periodic data lists which are different from each other.

5. An industrial robot comprising an information processing device, wherein the information processing device is the information processing device defined in claim 1.

* * * * *